Patented Sept. 7, 1937

2,092,123

UNITED STATES PATENT OFFICE 2,092,123

METHOD OF PRODUCING FERTILIZERS

Oskar Kaselitz, Berlin, Germany

No Drawing. Application January 21, 1935, Serial No. 2,793. In Germany January 27, 1934

6 Claims. (Cl. 71—33)

My invention relates to fertilizers and more particularly to a process of producing a neutral mixed fertilizer containing phosphorus.

It is an object of my invention to provide means whereby such fertilizers can be produced in a particularly simple and economical manner.

When treating ordinary superphosphate with ammonia gas, the water-soluble mono-calcium phosphate is converted into dicalcium-phosphate and the conversion possibly proceeds to the insoluble tricalcium phosphate, while at the same time ammonium sulphate is formed.

If double superphosphate, which constitutes a smeary mass, whose treatment is connected with great difficulties, is treated with ammonia gas, there results a mixture of dicalcium phosphate and diammonium phosphate, which forms a non-uniform crumbling product. In both cases the quantity of ammonia which is absorbed, is subject to variations, so that the final products are not uniform and inhomogeneous.

I have now found that a neutral stable phosphate fertilizer, free from foreign matter, can be produced if mono-calcium phosphate is suspended in a solution of ammonium phosphate, resulting in the operation and circulating in the process and if at constant ordinary elevated temperature such quantity of ammonia gas is introduced into this suspension that the required proportion of ammonia to phosphoric acid is maintained in the solution. By this treatment the mono-calcium phosphate is converted into dicalcium phosphate and at the same time ammonium phosphate is formed, which separates out. The mixture of the two compounds, which have settled down, is separated from the mother liquor and dried. The mother liquor, which mainly contains ammonium phosphate, is recycled into the process for use in a further operation. In order to recover an altogether uniform product, the quantity of mother liquor introduced into and resulting in the process must be kept constant and therefore any water in excess, which may be present, must be evaporated, due consideration being paid to the mother liquor adhering to the compounds separated out, which must be replaced in a suitable manner.

When operating in this manner one obtains uniform products of constant composition.

In order to form from the mixture of salts, which merely contains ammonia nitrogen and phosphoric acid as fertilizing agents, a fertilizer containing all the necessary constituents, other fertilizer salts, such as for instance ammonium and potassium salts, may be admixed to it before or after drying.

The operation of the process as well as also and more particularly the uniform character and stability of the products are rendered particularly advantageous, if the fertilizer salts to be added are introduced into the ammonium phosphate solution together with the mono-calcium phosphate and if the mixture of all the salts, after having been treated with ammonia gas, is separated from the mother liquor.

In order to increase the percentage of nitrogen in the product and at the same time to incorporate nitrate nitrogen, one may also add to the suspension, before neutralizing with ammonia, nitric acid together with other fertilizing agents, more particularly such as contain potassium. The mixture of salts obtained in this case may be treated with ammonia before, during or after drying. If the process is carried through in this manner, particular advantages are obtained while when mixing the phosphates separated out with the dry fertilizer salts, conversions may subsequently occur, more especially if hygroscopic salts have been added, which may cause the mass to cake and harden during storage. The entering of the additional fertilizer salts together with the mono-calcium phosphate into the mother liquor and the act of stirring the suspension in order to obtain an intimate mixture causes the conversion of the mixture into stable compounds to take place during the precipitation.

After having been separated from the mother liquor and dried, the mixed fertilizer thus obtained forms a perfectly storable and scatterable product, since no subsequent conversion will take place during storage.

In practising my invention I may, for instance, proceed as follows:

*Example 1.*—To 114 grams of a solution containing 39.6 grams $H_3PO_4$, 7.44 grams $NH_3$ and .07 gram Ca per 100 grams water are added under stirring at 25° C. 60 grams mono-calcium phosphate, to which may still adhere some free phosphoric acid. Into the suspension thus obtained are introduced under cooling at 25° C. 4.5 grams gaseous $NH_3$. On separating the precipitate by filtration there are obtained 105 grams of a solution which contains 39.4 grams $H_3PO_4$, 7.25 grams $NH_3$ and .08 gram Ca, and a mixed fertilizer containing 45.4% $P_2O_5$ and 4.62% N, corresponding to a mixture of mono-ammonium phosphate and dicalcium phosphate.

*Example 2.*—Into 127 grams of a solution containing 77.7 grams $H_3PO_4$, 22.0 grams $NH_3$ and .04 gram Ca per 100 grams water are introduced and suspended at 25° C. 60 grams mono-calcium phosphate, to which still adheres some phosphoric acid resulting from the process in which it was prepared. Into this suspension are introduced under cooling at 25° C. 9.0 grams $NH_3$. After separating the precipitate by filtration there are obtained 137 grams of a solution containing 78.2 grams $H_3PO_4$, 21.6 grams $NH_3$ and .03 gram Ca per 100 grams water and a mixed fertilizer containing 48.4% $P_2O_5$ and 8.9% $NH_3$, which corresponds to a mixture of diammonium phosphate and dicalcium phosphate.

Various changes may be made in the details disclosed in the foregoing specification without departing from the invention or sacrificing the advantages thereof.

I claim:

1. The process of producing a neutral mixed fertilizer comprising suspending mono-calcium phosphate in a mother liquor, which is saturated with ammonium phosphate salts containing about 1 to 2 mols $NH_3$ for 1 mol. $H_3PO_4$ and results in the operation of the process, introducing into the suspension at constant temperature the quantity of ammonia gas which suffices to maintain the proportion of ammonia to phosphoric acid constant in the mother liquor, separating the precipitated salt mixture and recycling the mother liquor into the process.

2. The process of producing a neutral mixed fertilizer comprising suspending mono-calcium phosphate in a mother liquor, which is saturated with ammonium phosphate salts containing about 1 to 2 mols $NH_3$ for 1 mol. $H_3PO_4$ and results in the operation of the process, introducing into the suspension at constant temperature the quantity of ammonia gas which suffices to maintain the proportion of ammonia to phosphoric acid constant in the mother liquor, separating the precipitated salt mixture, evaporating the mother liquor to restore the quantity introduced into the process, and recycling said mother liquor into the process.

3. The process of producing a neutral mixed fertilizer comprising suspending mono-calcium phosphate in a mother liquor, which is saturated with ammonium phosphate salts containing about 1 to 2 mols $NH_3$ for 1 mol. $H_3PO_4$ and results in the operation of the process, introducing into the suspension at constant temperature the quantity of ammonia gas which suffices to maintain the proportion of ammonia to phosphoric acid constant in the mother liquor, separating the precipitated salt mixture and adding to it another fertilizer salt, the mother liquor being recycled into the process.

4. The process of producing a neutral mixed fertilizer comprising suspending in a mother liquor, which is saturated with ammonium phosphate salts containing about 1 to 2 mols $NH_3$ for 1 mol. $H_3PO_4$ and results in the process, mono-calcium phosphate and another fertilizer salt, introducing into the suspension at constant temperature the quantity of ammonia gas which suffices to maintain the proportion of ammonia to phosphoric acid constant in the mother liquor, separating the precipitated salt mixture and recycling the mother liquor into the process.

5. The process of claim 1 wherein a mother liquor is used containing $H_3PO_4$, $NH_3$ and Ca dissolved in the proportions by weight of about 39.6 to 7.44 to .07 respectively.

6. The process of claim 1 wherein a mother liquor is used containing $H_3PO_4$, $NH_3$ and Ca dissolved in the proportions by weight of about 77.7 to 22.0 to .04, respectively.

OSKAR KASELITZ.